United States Patent [19]

Einstein

[11] 4,165,451
[45] * Aug. 21, 1979

[54] NOTE PAD SUPPORTS FOR DESK TELEPHONES

[75] Inventor: Irving Einstein, Miami Beach, Fla.

[73] Assignees: Ruth Astor, Boulder, Colo.; Estelle Goldberg, Silver Springs, Md.

[*] Notice: The portion of the term of this patent subsequent to Jan. 18, 1994, has been disclaimed.

[21] Appl. No.: 879,626

[22] Filed: Feb. 21, 1978

Related U.S. Application Data

[63] Continuation-in-part of Ser. No. 843,201, Oct. 18, 1977, abandoned.

[51] Int. Cl.² .......................................... H04M 1/21
[52] U.S. Cl. ..................................... 179/178; 40/336; 248/441 C; 281/15 B
[58] Field of Search ............ 179/178, 146 R; 40/336, 40/339; 312/317 R, 317 A; 248/302, 441 B, 441 C, 225.3; 281/15 B

[56] References Cited

U.S. PATENT DOCUMENTS

| | | | |
|---|---|---|---|
| 2,626,479 | 1/1953 | Marrits | 248/441 C X |
| 3,172,633 | 3/1965 | Allen | 248/225.3 |
| 3,370,816 | 2/1968 | Michaud | 248/441 C X |

FOREIGN PATENT DOCUMENTS 664089  1/1937  Fed. Rep. of Germany ......... 281/15 B Primary Examiner—Thomas W. Brown
Attorney, Agent, or Firm—Erwin M. Barnett

[57] ABSTRACT

A platform for supporting a note pad in horizontal writing position adapted to mount along the rear of a desk telephone, having a pair of platform openings positioned to be engaged by the projecting tops of the rear pair of cradle posts, and having a hinged brace adapted to extend at an acute angle to the platform and engage the top of the telephone skirt, has a resilient tie-down means which extends from the underside of the platform and hooks under the bottom edge of the telephone skirt to prevent accidental dislodgement of the platform. In a modified form the platform is made from a cardboard blank with the brace cut from portions thereof and hinged along a score line. Another form provides tabs for supporting a calender in upstanding position.

10 Claims, 10 Drawing Figures

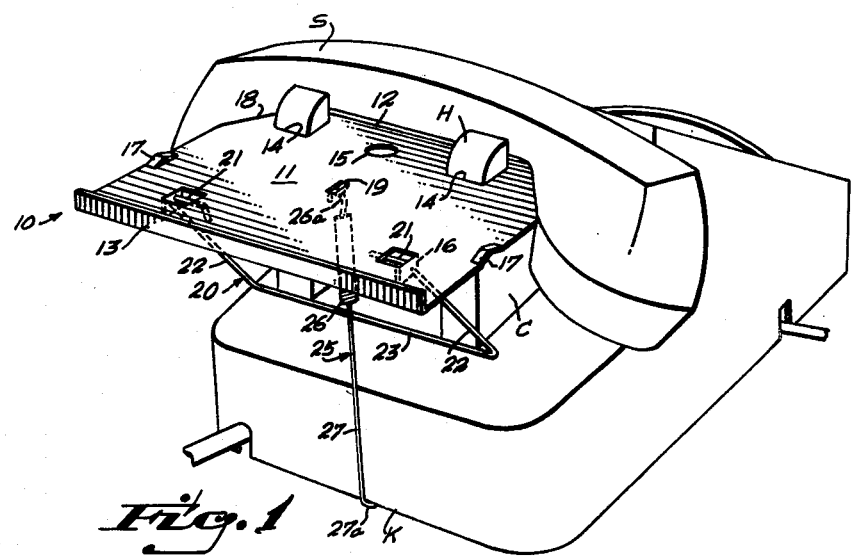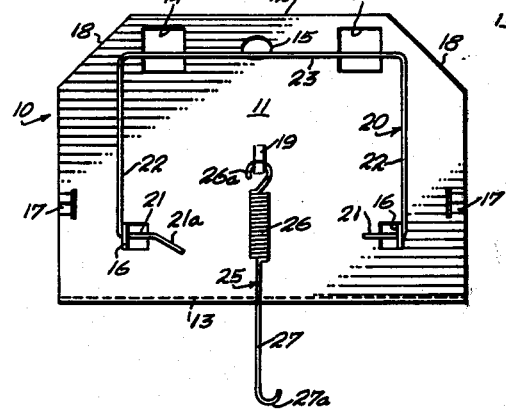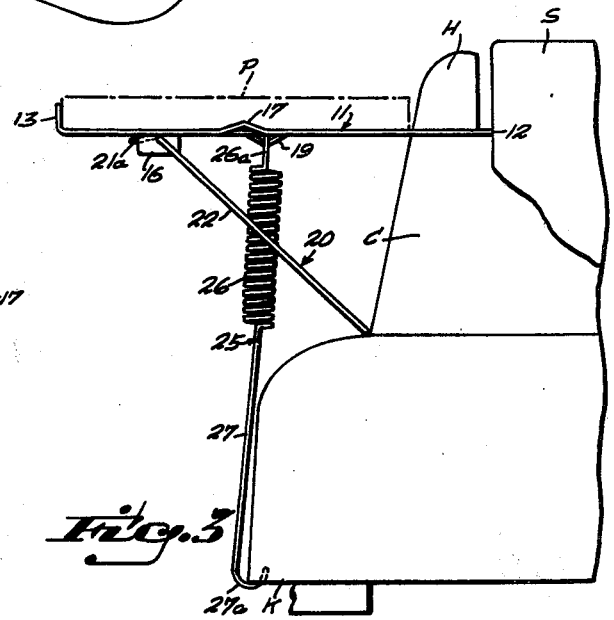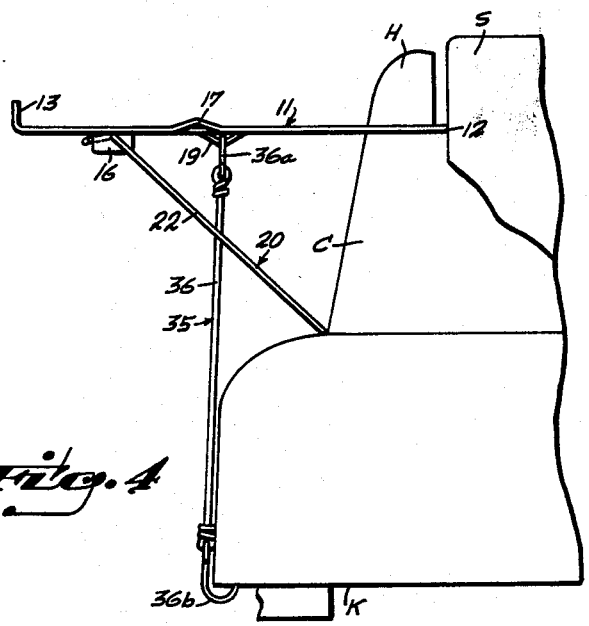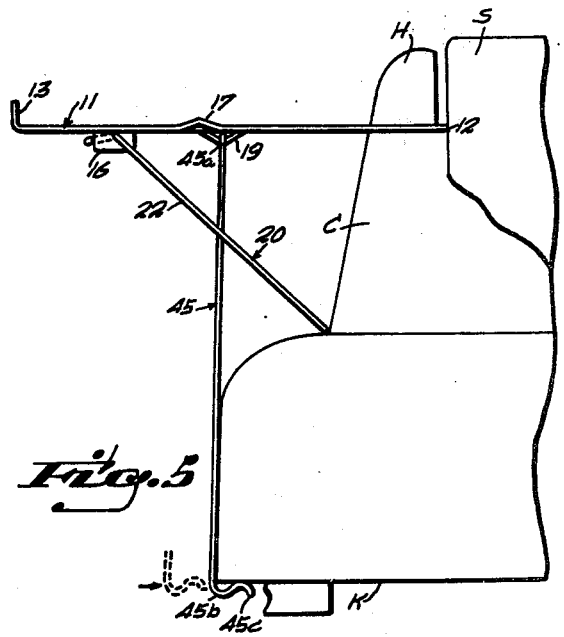

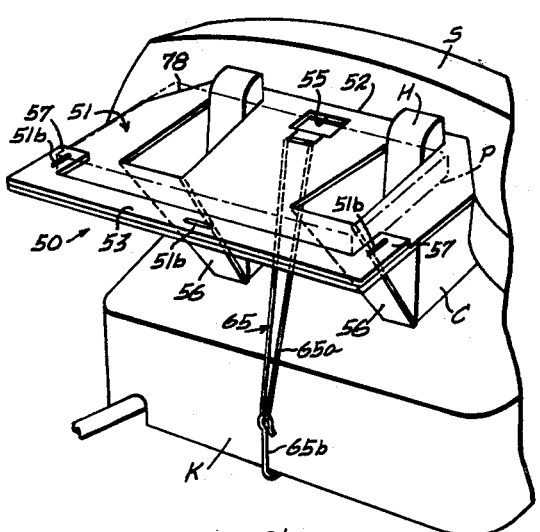
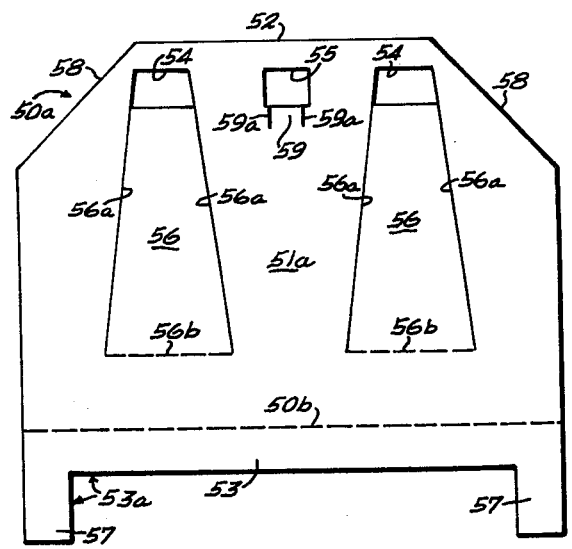
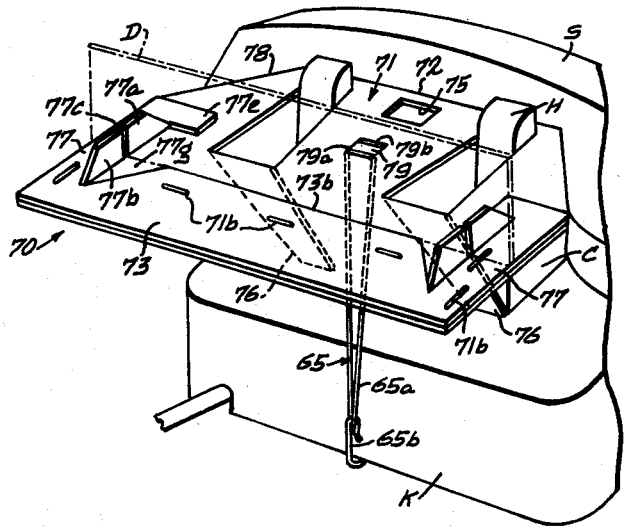
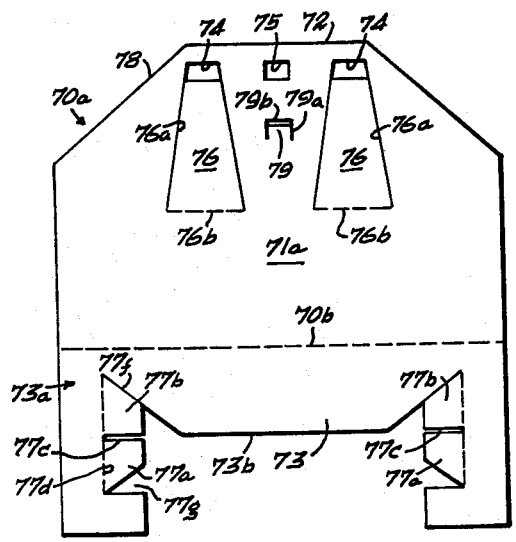
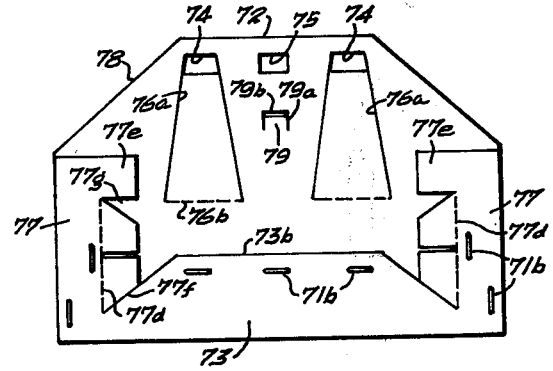

NOTE PAD SUPPORTS FOR DESK TELEPHONES

This is a continuation-in-part of my patent application Ser. No. 843,201, filed Oct. 18, 1977, now abandoned and entitled IMPROVEMENT IN NOTE PAD ACCESSORY FOR DESK TELEPHONES.

BACKGROUND OF THE INVENTION

1. Field of the Invention

This invention relates to an improvement in a collapsible and readily mailable accessory for desk telephones which is easily attachable to serve as a memorandum pad support and writing instrument holder and which also includes a support for a calender in upstanding position and may have a holder for a personal directory in either open or closed position.

2. Description of the Prior Art

This invention is an improvement of my quickly attachable note pad accessories for desk telephones disclosed in my prior U.S. Pat. No. 4,004,112 and corrects an instability and possible displacement of the note pad supporting platform from its intended position which is occasionally encountered when the telephone hand set is removed from the cradle or when the platform is inadvertently struck by the user. The platform of my prior accessory is constructed for manufacture by stamping from sheet metal or by molding of plastic which is then assembled with the wire brace. This results in a costly procedure for a product which is intended for merchandising primarily through the advertising and premium trade.

SUMMARY OF THE INVENTION

Among the objects of the invention is to improve the accessories for desk telephones described in my hereinbefore mentioned U.S. patent which, by simple means and at low cost, shall substantially preserve the collapsibility for compact shipping and the quick attachability for easy mounting on the telephone base without tools and with a minimum of manual skill. The improvement shall provide the note pad accessory platform with securing means against accidental displacement for maximum stability and shall provide alternative construtions cut out from cardboard blanks and scored for folding into platforms with integral braces.

Similar to that described in my said prior patent, these accessories each comprise a flat platform sized to extend along the rear of a desk telephone base having a front edge portion resting on the hand set cradle and being removably attached to the rear horns of the cradle posts by means of a pair of cutout openings through which the horns extend and snugly engage. The platform is mounted to extend widthwise rearwardly in a horizontal plane to support a note pad thereon and may have a third opening formed between the pair of openings serving as a holder for a writing instrument. A brace is swingably attached to extend downwardly and forwardly from the platform to engage a reentrant corner formed between the skirt and the cradle posts of the telephone base.

Cardboard constructions of the accessory are formed as a blank cut from stiff cardboard sheet material and scored for folding into a bordered platform having a pair of integral, cutout, swingable brace members and a modified form in which the border also has integral, cutout and bendable tabs for supporting a calender in upstanding position.

In a metal or plastic construction, the brace is provided as a wire bail-like member pivotally attached at opposite ends thereof to a pair of spaced ears extending from the bottom side of the platform inwardly of the rear edge thereof.

The improved accessories also comprise a tie extending from the bottom side of the platform and has a hooked lower end adapted to engage the bottom edge of the telephone skirt. A downward force is exerted on the platform against the wire brace or cardboard brace members by the axial resiliency of the tie which may be provided by incorporating therein a tension spring or an elastic band which also provide the elasticity for size adjustability and easy mounting. As alternatives, the tie may be presized for a snug fit and made of a resiliently flexible but not expandable wire having an open mouth hook for snapping into engagement under the bottom edge of the telephone skirt, or may be an annular rubber band suitably attached to the cardboard platform, as by a staple or by extending across the base of an integral tongue, and bearing a hook for the skirt bottom edge engagement.

BRIEF DESCRIPTION OF THE DRAWINGS

FIG. 1 is a rear perspective view of a desk telephone on which is mounted a note pad support accessory embodying the invention.

FIG. 2 is a bottom plan view of the platform of the accessory shown in FIG. 1 removed from the telephone and showing the brace folded against the bottom side of the platform and the tie lying loosely against the latter.

FIG. 3 is a side elevational view of the mounted accessory shown in FIG. 1, the note pad being indicated in broken lines.

FIG. 4 is a side elevational view similar to FIG. 3 showing the accessory having a modified tie formed with an elastic band.

FIG. 5 is a side elevational view similar to FIG. 3 showing the accessory having another modified tie formed as a fitted resiliently flexible wire, the lip of the open hooked end of the tie being shown in broken lines in position preparatory to snapping into the fully engaged position shown in full lines.

FIG. 6 is a rear perspective view of a desk telephone similar to FIG. 1 but mounting a modified note pad support accessory embodying the invention made of cardboard, the note pad being indicated in broken lines in position on the platform.

FIG. 7 is a plan view of a cardboard blank cut and scored prior to folding into the accessory shown in FIG. 6.

FIG. 8 is a rear perspective view of a desk telephone similar to FIG. 6 but mounting another modified note pad support accessory made of cardboard having means for supporting a calender as shown in broken lines installed in upstanding position.

FIG. 9 is a plan view of a cardboard blank cut and scored prior to folding into the accessory shown in FIGS. 8 and 9A, and FIG. 9A is a plan view of the blank shown in FIG. 9 folded and stapled to form the platform in accordance with the invention prior to mounting on the telephone as shown in FIG. 8.

DESCRIPTION OF THE PREFERRED EMBODIMENTS

Referring in detail to the drawings, 10 generally denotes a note pad support and pen holder accessory similar to that described in my said prior patent and fitted with a tie to achieve the improved stability embodying the invention. Accessory 10 is shown in FIGS. 1, 2 and 3 to comprise a substantially flat platform 11, a pivoted brace 20 and a tension applying tie 25. Platform 11 has a front edge 12 with beveled corners 18, a rear upturned flange 13 and a pair of cutout openings 14 symmetrically located adjacent front edge 12, openings 14 being spaced and sized to receive therein the pair of rear horns H of telephone base cradle posts C. Platform 11 may also be formed with an oval opening 15, sized to accommodate a pen or pencil, located midway between openings 14, and a pair of ears 16 projecting from the bottom side thereof. Ears 16 have suitable openings aligned with each other serving as a hinge for brace 20. A pair of raised bosses 17 are stamped adjacent opposite side edges of platform 11 and coact with horns H and rear edge flange 13 in centering note pad P thereon.

Brace 20 has a generally U-shaped bail-like configuration with opposite free end portions 21 bent at right angles to opposite parallel portions 22, the latter being connected in right angular relation to opposite ends of intermediate portion 23. Free end portions 21 extend in axial alignment through the openings in ears 16 for pivotal attachment of brace 20 to platform 11. One of the end portions 21 may be extended and have a terminal portion 21a bent out of the pivotal axis serving as a limiting means for the downward swing of brace 20.

Tie 25 is seen in FIGS. 1, 2 and 3 to comprise a tension spring 26 for axial resiliency terminating at an upper end in a hook 26a and has the opposite, lower end formed as an elongated wire portion 27 which terminates in a bottom hook 27a. Hook 26a is pivotally attached to the underside of a midportion of platform 11 by engaging a suitable, integrally formed anchoring means, such as, lug 19 cut and depressed from platform 11. An ear similar to ears 16 may be provided instead of lug 19. Hook 27a is sized and shaped to engage the bottom edge of the peripheral skirt K of the telephone base. As seen in FIG. 3, tie 25 is proportioned so that tension spring 26 when stretched in mounted position is of a length shorter than the distance between platform 11 and the upper portion of skirt K to completely clear the latter while wire portion 27 is sized to extend along the vertical height of skirt K.

The operation of accessory 10 will now be apparent. Accessory 10 is packaged in a compact condition with brace 20 and tie 25 both folded against platform 11 and tie 25 placed diagonally so as not to project beyond the edges of platform 11. After platform 11 is positioned on the telephone base with openings 14 engaging horns H and intermediate portion 23 of brace 20 positioned to engage the reentrant corner formed between skirt K and cradle posts C as shown in FIGS. 1 and 3 and described in my said prior patent, tie 25, which will be hanging loosely from platform 11, may be grasped by the lower part of spring 26 and stretched downwardly so that hook 27a readily engages the bottom edge of skirt K and when released exerts its tension and secures platform 11 in position against inadvertent displacement.

FIG. 4 shows an accessory modified to the extent that a tie 35 is formed of an elastic band 36 in place of tie 25, hooks 36a and 36b being suitably attached in any well understood manner to the opposite ends of band 36. Hook 36a, shown to engage lug 19 in a manner similar to hook 26a, may be ommitted and the upper end of elastic band 36 directly attached to platform 11 by passing the end portion through lug 19 which is then crimped to retain the end of elastic band 36 therein in the well understood manner. Elastic band 36 is stretched in a manner similar to spring 26 to engage hook 36b under the bottom edge of skirt K.

FIG. 5 shows another accessory fitted with a tie 45 of modified construction which is formed of a relatively stiff but flexibly resilient wire having an upper hooked end 45a engaging lug 19 in the same manner as hook 26a of tie 25. Instead of having the range of longitudinal adjustability provided by the axial resiliency of tension spring 26 of tie 25 or of the elastic band 36 of tie 35, tie 45 is properly sized in length so that hook 45b on the lower end thereof will snap into engagement with the bottom edge of skirt K under slight tension. For this purpose, hook 45b has an open mouth with a downwardly curved lip 45c adapted to be positioned against the exterior side of the bottom edge of skirt K, as shown in broken lines in FIG. 5, and to deflect downwardly on the exertion of inward finger pressure on the lower portion of tie 45 to snap hook 45b into the full line, skirt-engaging position. This snap-in engagement may be facilitated by simultaneously exerting a downward pressure on platform 11.

A modified form of accessory 50 is shown in FIGS. 6 and 7 to comprise a flat cardboard platform 51 having a pair of integrally formed brace members 56 and a tension applying tie 65. As will be clear from FIG. 7, platform 51 may be formed from a cardboard blank 50a cut out and divided by a scored transverse fold line 50b into a large panel 51a and a small panel 53a. Large panel 51a has a front edge 52 formed with beveled corners 58 and a pair of cutout openings 54 symmetrically located adjacent front edge 52 and an opening 55 midway between openings 54, the latter being spaced and sized to receive therein the pair of horns H of telephone base cradle posts G. Aligned with openings 54 are a pair of integral brace members 56 formed by converging slits 56a cut to extend from aligned scored fold lines 56b extending parallel to and spaced inwardly of fold line 50b, slits 56a terminating at cutout openings 54. A pair of short slits 59a extend inwardly from opening 55 defining a tongue 59 across the base of which rubber band 65a of tie 65 may be attached as hereinafter more fully described. Small panel 53a is cut out to provide a raised, rear border 53 and opposite, raised, short end borders 57.

Cardboard blank 50a, cut and scored as hereinbefore described, is fashioned into platform 51 by folding small panel 53a along scored fold line 50b to overlie the upfacing side of large panel 51a and is suitably secured in place, as by an adhesive, or as shown, by staples 51b.

It will be understood that a tie similar to ties 25, 35 or 45 may be suitably attached, as by staples, to the downfacing side of platform 51. However, FIG. 6 shows platform 51 utilizing tie 65 which comprises a conventional annular rubber band 65a passing through the looped end of wire hook 65b. Rubber band 65a may also be stapled to the downfacing side of platform 51 or, as shown, may be attached thereto by extending through short slits 59a and along the upfacing surface of platform 51 at the base of tongue 59. This attachment is readily accomplished by threading a portion of rubber band 65a upwardly through opening 55 and then looping the rubber band 65a across the base of tongue 59 by sliding portions thereof into slits 59a for a snug fit against accidental displacement.

Accessory 50 is packaged for mailing or shipping in flattened condition with brace members 56 co-planar with platform 51 and with rubber band 65a enclosed separately for attachment when mounting, or rubber band 65a may be stapled in place inwardly of tongue 59 or anchored at the base thereof as shown in FIG. 6. Where rubber band 65a is stapled initially, short slits 59a defining tongue 59 are provided to facilitate rubber band replacement should the original break during use. To mount accessory 50, brace members 56 are bent downwardly and platform 51 placed on the rear of the telephone with horns H extending through openings 54 and held horizontally so that the free lower ends of brace members 56 engage the reentrant corners formed between skirt K and cradle posts C. Wire hook 65b is then pulled down, stretching rubber band 65a, and engaged under the bottom edge of skirt K to secure accessory 50 in position. A note pad P may then be positioned on platform 51, as indicated in broken lines in FIG. 6, bounded by horns H at the front, by raised border 53 at the rear and by raised short end borders 57 at the opposite sides.

Accessory 70, shown in FIGS. 8, 9 and 9A, is a modification of accessory 50 having a cardboard platform 71 which is larger in area than platform 51 to provide an integral holder for an upstanding calender D. In a manner similar to platform 51, platform 71 is formed from a cardboard blank 70a cut out and divided by a scored transverse fold line 70b into a large panel 71a and a small panel 73a.

Except for the overall size, large panel 71a is similar to large panel 51a and is shown to have a front edge 72 with beveled corners 78, spaced openings 74 with opening 75 therebetween, and converging slits 76a extending from aligned scored fold lines 76b to provide integral brace members 76. While short slits may be provided extending inwardly from opening 75 in a manner similar to slits 59a providing tongue 59 on platform 51, tongue 79 is shown more centrally located on platform 71 and formed by a short transverse slot 79b and a pair of spaced parallel slits 79a extending rearwardly from the opposite ends of slot 79b. This arrangement for a tongue may also be utilized, if desired, on platform 51.

Small panel 73a is larger than panel 53a of platform 51 and has additional elements to support calender D in upstanding position. Calender D is contemplated to be of conventional construction and be of the type having twelve sheets, one for each month, stapled to a cardboard backing which usually bears printed advertising material. Small panel 73a has a central cutout formed to provide a raised rear border 73 for platform 71 and opposite raised end borders 77 from which two pairs of tabs are formed by suitable slitting and stamping, such as oblique slits 77f and triangular cutouts 77g. Such tabs are seen as front tabs 77a and rear tabs 77b separated by slots 77c and adapted to bend upwardly along scored fold lines 77d. Adjacent front tabs 77a beyond cutouts 77g are raised border extensions 77e which define the opposite side positioning of a note pad P, horn H and calender D defining the front and rear positions, respectively, thereof.

To complete platform 71, a small panel 73a is folded along line 70b to overlie large panel 71a and is secured thereto by adhesive or, as shown in FIG. 9A, by staples 71b. Tie 65 is attached to tongue 79 in a manner similar to that hereinbefore described for attachment to tongue 59, namely, by threading elastic band 65a upwardly through slot 79b and then sliding the loop along slits 79a to the base of tongue 79, as seen in FIG. 8.

The mounting of accessory 70 on the telephone base is accomplished in the same manner as accessory 50. Where mounting of calender D is desired, the bottom edge of the latter is positioned along the edge 73b of rear raised border 73 and the opposite ends inserted into slots 77c which align with edge 73b. Front and rear tabs 77a and 77b are then bent upwardly along scored fold lines 77d to retain calender D in upstanding position as illustrated in FIG. 8.

Although platform 11 is herein illustrated solely in its simple form for note pad support only, the invention is likewise applicable to a platform modified with upstanding tabs for supporting a calender and fitted with a removable wire guide for mounting a small directory in closed position or in open position for viewing contents thereof while dialing as shown and described in my said prior patent. Reference to the platform in the claims herein should therefore be construed to include platforms modified for calender and directory support where applicable.

Where cardboard platform 51 or 71 are used in accessories as premium articles, the upfacing surfaces of panels 53a and 73a may be imprinted with advertising. Also, where a larger area for such advertising is desired, panels 51a and 53a, without calender supporting tabs, may be made larger on the scale of panels 71a and 73a and thereby provide raised rear borders 53 and short end borders 57 with larger surface areas.

The cardboard constructions of the note pad support accessories for desk telephones and the provision of elastic ties for stability are seen to achieve the several objects of the invention and to be well adapted to meet conditions of practical use. As various possible embodiments might be made of this invention, and as various changes might be made in the disclosed constructions, it is to be understood that all matter herein set forth and shown in the accompanying drawings are to be interpreted as illustrative and not in a limiting sense.

What is claimed is:

1. A desk telephone accessory comprising a flat platform sized to extend along the rear of a desk telephone base and have a front edge portion resting on the hand set cradle and to extend horizontally rearwardly to support a note pad thereon, said front edge portion being formed with a pair of spaced cutout openings for engaging the horns of the rear pair of cradle posts of said base, brace means extending from a bottom side of the platform forwardly and downwardly to engage said telephone base, a tie attached to said bottom side of the platform and terminating in a hook for engaging the bottom edge of a skirt of said telephone, said brace means and horn engagement in the cutout openings supporting said platform in said horizontal position for writing on said note pad positioned on the platform, and said tie exerting a downward force on said platform against said brace means securing the platform against dislodgement.

2. The accessory defined in claim 1 in which said platform is made of cardboard sheet material and said brace means comprises a pair of brace members integrally formed from the platform by pairs of slits extending rearwardly from said spaced cutout openings to scored lines along which the brace members are unfolded for said forward and downward extension to engage said telephone base.

3. The accessory defined in claim 1 in which said platform is made of cardboard sheet material having a relatively larger panel forming said platform and a relatively smaller panel overlying said larger panel at a rear portion thereof, said smaller panel having portions cut out and scored as two pairs of aligned tabs, one pair being located along each opposite side of the platform, each pair of tabs having a slot therebetween and being bendable upwardly along a scored fold line to support a cardboard backed calender extending through said slots in upstanding position on said platform.

4. The accessory defined in claim 1 in which said tie has axial resiliency for exerting said downward force and for longitudinal adjustability for effecting said hook engagement with the bottom edge of the skirt.

5. The accessory defined in claim 4 in which said tie includes a tension spring portion for said axial resiliency.

6. The accessory defined in claim 4 in which said tie includes an elastic band for said axial resiliency.

7. The accessory defined in claim 6 in which said platform is formed with an integral tongue and said elastic band is annular and extends as a loop across the base of said tongue as said tie attachment to the platform, said hook having a looped upper end engaging said annular elastic band.

8. The accessory defined in claim 1 in which said platform has an integrally formed lug and said tie has a second hook engaging said lug as said attachment to the platform.

9. The accessory defined in claim 8 in which said tie is a relatively stiff, flexibly resilient wire having an upper hooked end as said second hook and a lower hook having an open mouth as said skirt engaging hook, said downward force exerted by the tie being provided as a snug fit of the tie between the platform and skirt bottom edge, said open mouth having a downwardly curved lip to facilitate snapping into said engagement with the skirt bottom edge.

10. The accessory defined in claim 1 in which said platform is made of cardboard sheet material having a relatively larger panel forming said platform and a relatively smaller panel overlying said larger panel at a rear portion thereof, said smaller panel being cut out to provide a raised rear border and opposite raised short side borders for positioning said note pad on the platform, said tie including an annular elastic band stapled to the underside of said larger panel, and said hook having a looped upper end engaging said annular elastic band.

* * * * *